United States Patent [19]

Bramer

[11] Patent Number: 4,701,037
[45] Date of Patent: Oct. 20, 1987

[54] REMOTE CONTROL REAR VIEW MIRROR, ELECTRICALLY OPERATED

[75] Inventor: Charles Bramer, Norton Shores, Mich.

[73] Assignee: Lacks Industries, Inc., Grand Rapids, Mich.

[21] Appl. No.: 829,010

[22] Filed: Feb. 13, 1986

[51] Int. Cl.[4] .......................... B60R 1/06; G02B 7/18
[52] U.S. Cl. .................................. 350/634; 350/637; 248/481; 403/143
[58] Field of Search ............... 350/634, 633, 637, 636; 248/481–484, 487, 477–479; 403/143, 114–117

[56] References Cited

U.S. PATENT DOCUMENTS

| | | | |
|---|---|---|---|
| 1,551,323 | 8/1925 | Offerdahl | 403/115 |
| 4,114,988 | 9/1978 | Enomoto | 350/634 |
| 4,401,289 | 8/1983 | Fisher et al. | 248/483 |
| 4,506,954 | 3/1985 | Enomoto | 350/634 |

*Primary Examiner*—Jon W. Henry
*Attorney, Agent, or Firm*—Shoemaker and Mattare, Ltd.

[57] ABSTRACT

A remote control rear view mirror which includes a housing having a mirror receptive opening provided therein and a mounting plate that is received in the opening and is fastened to the back wall of the housing, a drive motor unit that includes two separate electric motors in a common housing that is fastened to the mounting plate and are connected to an electrical power source, a mirror glass supporting frame member that has a ball-and-socket connection with the drive motor unit housing and includes a drive connection with each of the electric motors, and a retainer ring that is adapted to be mounted and supported on the mounting plate and to have a pivotal support and be restrictively engaged with the mirror glass supporting frame member.

1 Claim, 6 Drawing Figures

REMOTE CONTROL REAR VIEW MIRROR, ELECTRICALLY OPERATED

BACKGROUND OF THE INVENTION

This invention relates to remote control rear view mirrors and more particularly to a remote control rear view mirror which makes use of electric motors to adjust the viewing angle thereof.

Heretofor, the rear view mirrors used on passenger cars and smaller trucks have been generally considered too small in size to have any electric motors mounted right in the mirror housings to adjust the viewing angle of such mirrors. And, those designed to accomodate such motors, either in the housings or elsewhere, have had to be of special design, making their cost high and causing low production demand to keep the market prices inflated.

Only the larger sized rear view mirrors, the so-called West Coast mirrors used with large trucks, tractors and busses, have been made and offered with electric motors to operate them. And these are also quite expensive because of the low production and special design features required.

What appears to be needed is a rear view mirror construction that is adaptable for use as a manually operated rear view mirror, as a cable operated remote control rear view mirror and which can also accomodate and use electric motors to effect the viewing angle changes required of such mirrors. This would enable the main components of such mirrors to be made in larger quantities and thereby reduce the production costs for the power operated rear view mirrors.

Generally speaking, the mirror housing needs to be of sufficient size to accomodate the means which affords the pivotal support for the mirror and the actuating means, whether cable operated or electrical motors, within the same space. Or, stated another way, the electrical motors have to be so designed and packaged that they will fit within the same space that the manual support or cable operating means occupy in the other adaptations of the mirror parts.

As will be shown, this is best accomplished by not attempting to use the same means of pivotal support in the different types of mirrors but rather by modifying the means of support to afford more space and room in the mirror design which makes use of the electric motors.

Such design and other improvements will best be known and appreciated in referring to the drawing figures and their detailed description which follows.

DESCRIPTION OF THE DRAWING FIGURES

GENERAL DESCRIPTION OF THE STRUCTURE

Figure 1:
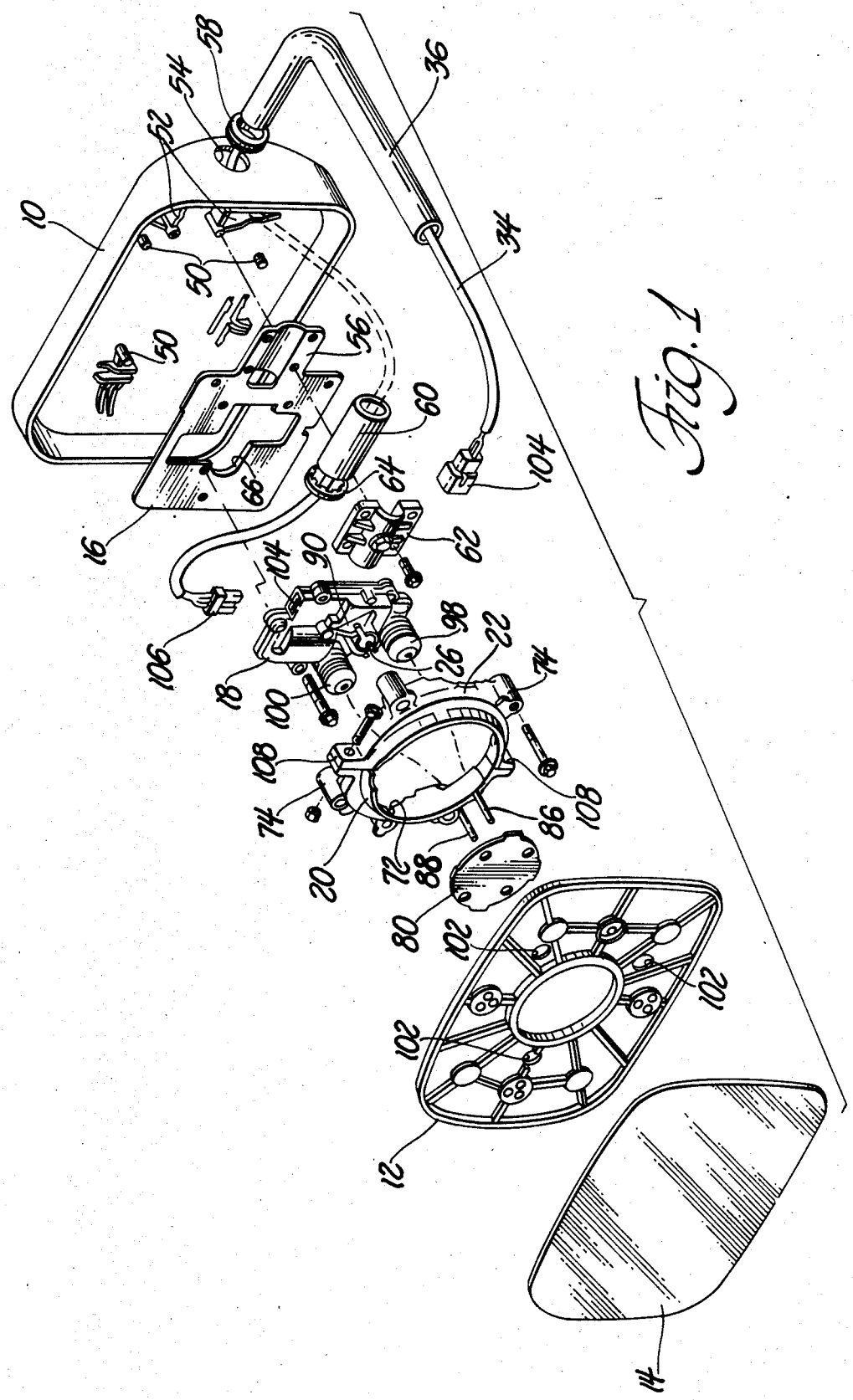
FIG. 1 is an exploded view of the remote control rear view mirror of this invention showing the various parts, including the electric motors, which are part of the overall construction.
Figure 2:
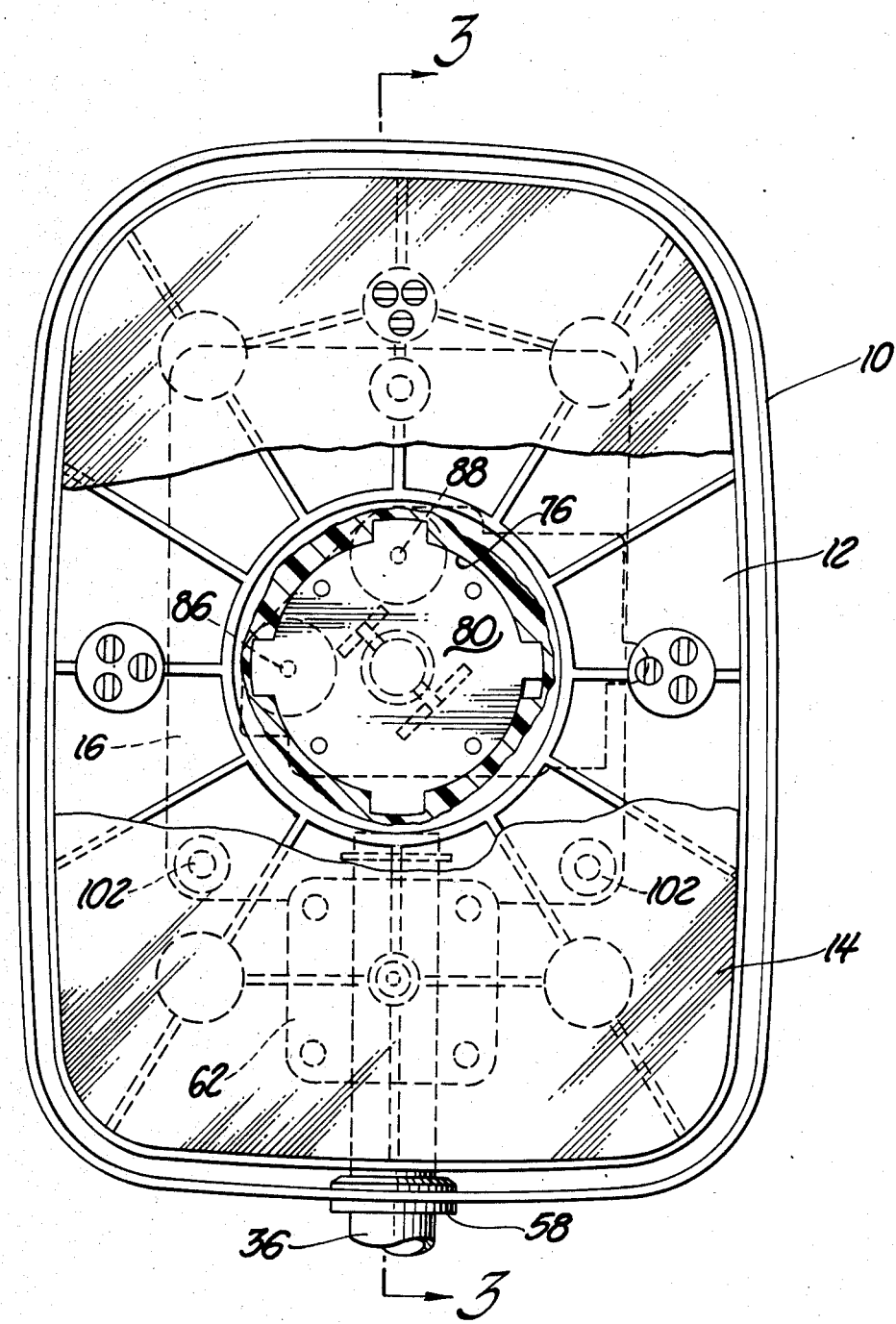
FIG. 2 is a front plan view of the mirror with a part of the mirror glass and a part of the mirror glass supporting frame member shown broken away to better illustrate certain inmportant features.
Figure 3:
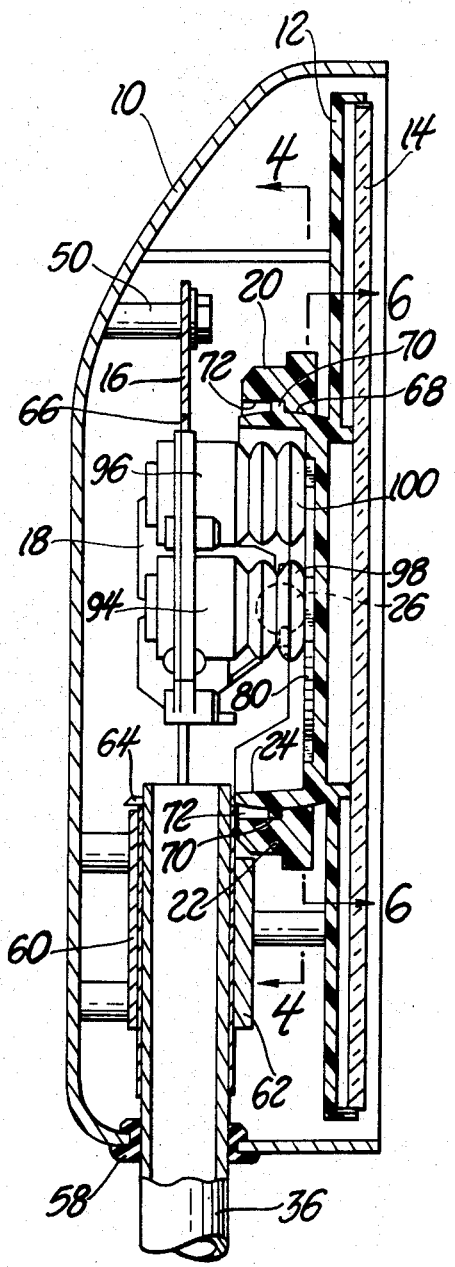
FIG. 3 is a cross-sectional view of the mirror of the previous drawing figure as seen in the plane of line 3—3 thereon and looking in the direction of the arrows.

The remote control rear view mirror of the present invention includes a housing or shell 10 which is open on one side and has a frame member 12 received and disposed in the opening that has a mirror glass 14 fastened to it.

Within the housing 10 and fastened to the back wall thereof, behind the mirror glass, is a mounting plate 16 that is formed to include an opening within which is received and positioned a drive motor unit 18.

The back of the mirror glass receptive frame member 12 is formed as at 24 for adjustable engagement and relative adjustment within two complementary halves 20 and 22 of a retainer ring that is fastened to the mounting plate around the drive motor unit 18.

The back of the mirror glass supporting frame member 12 is further formed with a ball head 26 that fits into a socket joint 28 formed in the center of the drive motor unit so that the frame and its mirror glass can be axially adjusted with respect thereto and will be also retained and restrained against flutter by the further-out engagement afforded by the retaining rings.

The drive motor unit 18 includes two small and distinctly separate electrical motors 30 and 32 that are operated by an electrical lead that extends through the tubular arm 36 that supports the mirror housing on a receptive vehicle body side wall. And, each of the small motors is capable of a forward and reverse drive which, through a suitable connection to the back side of the mirror glass supporting frame member, enables the mirror glass's viewing angle to be changed as and when desired from within the vehicle on which the mirror of this invention is mounted.

DETAILED DESCRIPTION OF THE STRUCTURE

The mirror housing or shell 10 is of a molded one piece plastic construction which is capable of having a chrome finish appearance and which is formed to include mounting pads 50 on the inner back wall for receiving and having the mounting plate 16 fastened to them. A more structurally braced pad 52 is provided near the opening 54 in the housing side wall through which the supporting arm 36 is received to provide additional strength and support for the mirror as mounted on a vehicle body side wall.

The mounting plate 16 is formed to fit in the housing 10, close to the back wall, and to be fixed by screw fasteners to the mounting pads 50. The end of the mirror supporting arm 36 is received through the side wall opening 54 and relatively over the receptively formed end 56 of the mounting plate, which is disposed in turn over the structurally braced mounting pads 52 just mentioned.

The end of the mirror supporting arm 36 is received through the protective grommet 58 in the opening 54 and through a short tube or sleeve part 60 that is held by a clamp 62 on the end of the mounting plate. And a lock ring 64 is provided on the end of the supporting arm that extends through the sleeve part to keep the end of the supporting arm engaged in the housing and still allow for some manual adjustment of the mirror on the arm.

As previously mentioned, the mounting plate 16 is formed to include an opening, identified as 66, within which is received and positioned the drive motor unit 18.

The back of the mirror supporting frame member 12 is formed at 24 to include a rearwardly extended and disposed projection that is circular in shape and has its outer surface inclusive of a convex spherical form, as at 68, that is adapted for fitted engagement with the two halves of the retainer ring 20 and 22. The back wall projection is also formed on diametrically opposite sides, right on the spherical surface, to include a couple of locating pins 70.

The inner walls of the retainer ring parts 20 and 22 are formed with a receptive concave spherical surface and include diametrically opposite slots 72, extending part way in from the back edge, that are receptive of the locating pins 70 on the back of the mirror frame member 12. Together the pins 70 and the slots 72 serve to keep the mirror glass relatively oriented in the mirror housing.

The retainer ring parts 20 and 22 include mounting posts 74, which are not too visible in the third drawing figure but can be more clearly seen in the first drawing figure, to fasten the ring parts to the mounting plate 16. They also serve to position the interengaging spherical surfaces together at a distance out from the mounting plate and to dispose the back wall of the frame member part 12 right over the drive motor unit 18.

Within the back wall of the mirror supporting frame member 12, and centrally within the circular wall 24 that extends outwardly therefrom, is a recessed area 76 that is circular in shape and has perpheral extensions 78. This same recess, in the back wall of the frame member, is receptive of a small circular disc 80 of relatively the same size and with ear tabs 82 that serve as locators to relatively orient the disc in the receptive recess.

This same small disc 80 is formed to have the ball head part 26 of the ball-and-socket connection mentioned previously, as being between the frame member and the drive motor unit, provided centrally thereon. And, as will be noted, the ball head part 26 is also formed to include a cross pin 84 that extends axially therethrough. Further, fastened to the disc and standing straight out therefrom are two separate and relatively spaced flex-screw members 86 and 88, disposed near the outer edges of the disc and on relatively transverse axes through the ball joint, with respect to each other.

Figure 4:
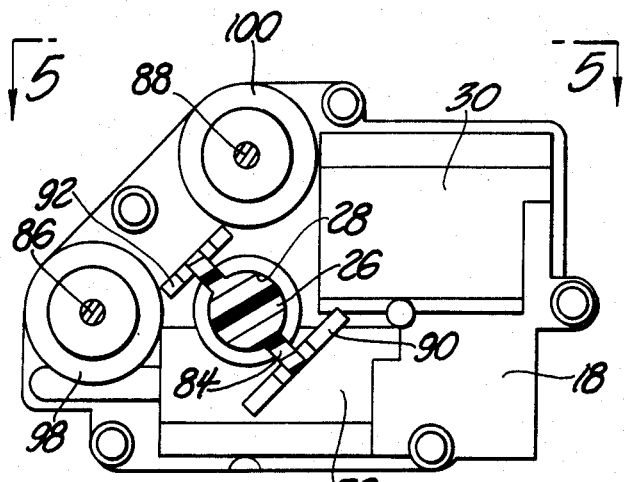
FIG. 4 is a cross-sectional view of the mirror of the immediately preceeding drawing figure as seen in the plane of line 4—4 thereon and looking in the direction of the arrows to show the electric motor assembly and the ball-socket support of the present mirror construction.
Figure 5:
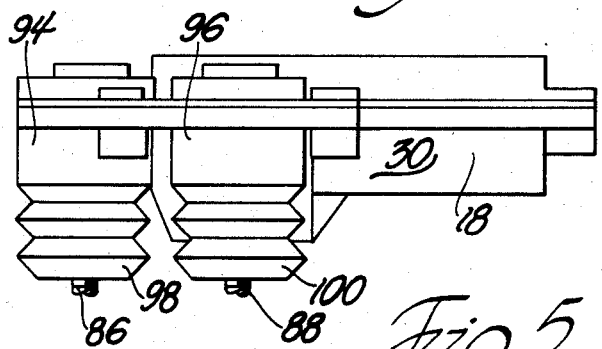
FIG. 5 is a top plan view of the electric motor assembly of the immediately preceeding drawing figure as seen in the plane of line 5—5 and looking in the direction of the arrows.
Figure 6:
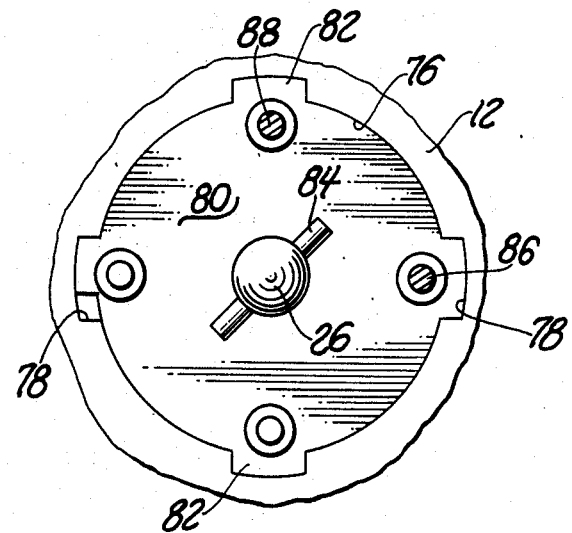
FIG. 6 is a partial view of the back of the mirror glass supporting frame member showing part of the ball-socket support, as generally seen in the plane of line 6—6 in FIG. 3 and looking in the direction of the arrows.

As shown in FIGS. 1, 4 and 5, the drive motor unit 18 includes two small electric motors 30 and 32, laid flat and side-by-side, within a common molded plastic housing, and with their shaft ends driving worm gears that are operative of other gear means within the identified areas of 94 and 96. The latter being open axially, covered with protective boots 98 and 100, and formed for threaded driving engagement with the flex-screws on the back of the mirror supporting frame member part 12.

The drive motor unit housing 18 is also formed to include the socket seat 28, as mentioned before, and to have the ball head part of the ball-and-socket joint snap-locked into engagement therewith. In addition, the opposite side walls of the socket seat are slotted and added pin-slotted braces 90,92 are provided outboard thereof for added structural protection of the cross-pin 84.

The frame member 12 is provided with access holes 102 at appropriate locations, for use before the mirror glass 14 is fastened to it, so that the retainer ring parts 20-22 may be fastened down by screw fastener means to the mounting plate 16 and the mounting plate itself, at the same time, may be fastened down on the mounting pads provided for it on the inner back wall of the mirror housing part 10.

Appropriate fittings 104 and 106 will be appreciated as provided on the ends of the electrical lead that passes through the mirror supporting arm 36 and as provided within the drive motor unit 18, to provide the necessary electrical power for the drive motors in their operation of the rear view mirror disclosed.

It will also be appreciated that the two halves of the retainer ring 20-22 are engaged and held together by fastener means through receptive ears 108 on the respective parts. And, that the retainer ring parts 20-22 are first engaged with the rear wall projection 24 on the mirror frame part, then tightened together, then they are fastened through the access holes 102 in the mirror frame part to the mounting plate 16 and with it to the back wall of the housing itself.

Of further note as regards the present construction is the fact that the same major parts may be used to provide a cable operated rear view mirror or a manually operated rear view mirror by simply changing the internal means of pivotal support and for controlled actuation, if called for.

For example, without the electrical motor unit and electrical lead into the housing 10, the mirror glass is adequately supported in the mirror frame 12, as mounted in the retainer rings 20-22, for manual adjustment with just some tightening of the two ring member parts for better frictional engagement and resistance in holding adjusted positions of the mirror. Or, with some simple molded plastic part that will provide a socket joint centrally and in association with the disc on the back wall of the mirror frame member part, without the flex-screws, for the added stability of a second pivotal connection.

And, the electrical drive motor unit 18 could be replaced, along with the disc and flex-screw connections, with some other form of cable operated means for actuating the mirror while still using the major parts shown and described.

All of which helps reduce the unit cost of producing the different mirror parts and reduces the overall production cost of such mirrors.

ASSEMBLY AND OPERATION

The rear view mirror of the present invention is assembled as follows:

The housing or shell 10 has the small seal or grommet 58 placed in the side wall opening or hole 54 and the mounting plate 16 placed in the housing on the receptive pads 50 and 52. The supporting arm 36, with the electrical lead 34, sleeve part 60 and lock ring 64 preassembled therewith, has its mirror end inserted through the side wall hole 54, the sleeve part fitted on the end of the arm that extends into the housing, and the lock ring 64 engaged on the end of the arm that extends through the sleeve part.

The clamp 62 is placed over the end of the mirror supporting arm, that is within the sleeve part 60, and is engaged by screw fasteners to the mounting plate and with the mounting plate right to the receptive pads 52 provided at the supported end of the mirror housing.

The small drive motor unit 18 is positioned over and within the opening 66 in the mounting plate 16 and is fastened to it by fastener means which hold and fix its position.

The small round disc 80, with the ear tabs 82, is fitted and fixed by suitable bonding on to the back of the mirror frame member part 12, within the receptive recess 76 in the back wall thereof. And, so that the flex-screws 86 and 88 are correctly disposed for drive engagement with the drive motor unit part 18 and so that the cross pin 84 on the ball head part 26 is properly oriented relative to the receptive slot in the socket seat 28.

The retainer ring parts 20-22 are next loosely engaged together by suitable fastener means and are fitted on the back of the mirror frame part 12, in engagement with the projection 24 on the back thereof and with the locating pins 70 on the one engaged in the receptive slots 72 in the other. And they are tightened together, but not fixedly; just enough to still allow relative movement and adjustment therebetween.

The mirror frame part 12, with the disc part 80 fixed to it, and the retainer rings 20-22 fastened to it, is then positioned over the mirror opening in the housing 10 and pressed downwardly to effect a snap-lock engagement of the ball head part 26 in the socket seat 28, and the threaded engagement of the flex-screws 86-88 with the drive gear means 94-96 of the drive motor unit 18.

The electrical lead 34 is connected to the drive motor unit 18 by means of the fittings on the ends thereof.

The mirror frame part 12 is further fastened and held in the housing 10 by means of screw fasteners that hold the retainer rings 20-22 to the mounting plate 16 and are accessible through the access holes 102 in the frame member part.

And, with everything else assembled, the mirror glass 14 is fastened to the outer face of the frame member part 12 to serve as the reflective surface for the disclosed remote control rear view mirror.

The mirror glass is afforded such movement as is allowed by the restrictions of the cross-pin 84 in the ball-and-socket joint and the locating pins 70 on the glass supporting frame part 12 that are engaged in the receptive slots 72 in the retainer rings.

Selective actuation of the electric motors 30 and 32, via the electrical lead 34 to the controls (not shown) in the vehicle on which the mirror is mounted, will cause the gear means 94-96 to axially advance or retract the flex-screw members 86-88 and thereby change the viewing angle of the mirror glass since the flex-screws are located on transverse axes relative to the ball-and-socket connection and with respect to the spherical surfaces provided on and between the frame projection 24 and the retainer rings 20-22.

Although a preferred embodiment of the present invention has been shown and described in considerable detail, it will be appreciated that this has been done to illustrate the general scope of the present invention and without any intent to unnecessarily limit the invention in any regard. And, accordingly, such improvements, modifications and alterations as come to mind and are within the spirit of the invention, and are not specifically excluded by the language of the hereinafter appended claims are to be considered as inclusive thereunder.

I claim:
1. A remote control rear view mirror, comprising:
    a housing having a mirror receptive opening provided therein and a mounting plate that is received therein and is adapted to be fastened to the inner back wall thereof,
    a drive motor unit including two separate electrical motors provided on said mounting plate and having means providing a connection to a source of electrical power,
    a mirror glass supporting frame member having a ball-and-socket connection with said drive motor unit and a drive connection with each of said electrical motors,
    a retainer ring adapted to be mounted and supported on said mounting plate and to have pivotal support and restrictive engagement with said frame member,
    said frame member having a rearwardly projected back wall part and said retainer ring including two complementary parts adapted for fitted engagement with said frame member back wall part,
    said back wall part and said retainer ring parts being formed for spherical surfaced pivotal engagement therebetween and with the same axial center as said ball-and-socket connection,
    means provided within said ball-and-socket connection and between said back wall and retainer ring parts for restricting and limiting the pivotal movement otherwise afforded thereto and therebetween,
    said means including a couple of locating pins on said back wall part for complementary engagement with slots in said retainer ring parts,
    a disc-like member provided on the back wall of said frame member centrally within said rearwardly projecting back wall part and being formed to provide the ball head part of said ball-and-socket connection and with a pair of relatively transversely spaced and flexible screw threaded members extending outwardly therefrom,
    said disc-like member being provided with tabs extending from the circumference thereof for alignment of said member with recesses in said back wall part,
    said drive motor unit having the socket joint of said ball-and-socket connecting provided thereon and having the electric motors thereof inclusive of worm gear drive operatively engaged with said screw threaded members on the back wall of said mirror supporting frame member part for providing the drive connection therebetween.

* * * * *